Oct. 21, 1930.                P. KELLER                1,779,396
                        MOLD FOR VULCANIZING TIRES
                            Filed Aug. 6, 1928

Inventor
Parry Keller
By
Attorney

Patented Oct. 21, 1930

1,779,396

UNITED STATES PATENT OFFICE

PARRY KELLER, OF AKRON, OHIO, ASSIGNOR TO THE GOODYEAR TIRE & RUBBER COMPANY, OF AKRON, OHIO, A CORPORATION OF OHIO

MOLD FOR VULCANIZING TIRES

Application filed August 6, 1928. Serial No. 297,738.

This invention relates to molds for vulcanizing solid rubber tires and it has particular relation to a ring employed by such molds for supporting the annular base upon which a tire is mounted.

An object of the invention is to provide a mold assembly in which the ring supporting the annular base of the tire is so constructed that steam or other vulcanizing medium may circulate freely adjacent the base of the tire.

One of the problems in vulcanizing solid tires and especially those of relatively great width, resides in the difficulty of applying heat uniformly to all portions of the inner periphery thereof. This is caused by the fact that the intermediate portions of the base of the tire are located a considerable distance from the points of application of the heat. Moreover, air pockets occasionally form between the tire supporting base and the ring employed to support it, and in certain instances, serve to insulate portions of the tire from the vulcanizing heat.

This invention provides a mold construction in which the tire base supporting ring has a plurality of circumferentially extending grooves on its outer periphery which communicate with the exterior parts of the mold to permit steam or other heating medium to circulate freely about the base of the tire.

For a better understanding of the invention, reference may now be had to the accompanying drawings, forming a part of the specification, of which;

Figure 1:
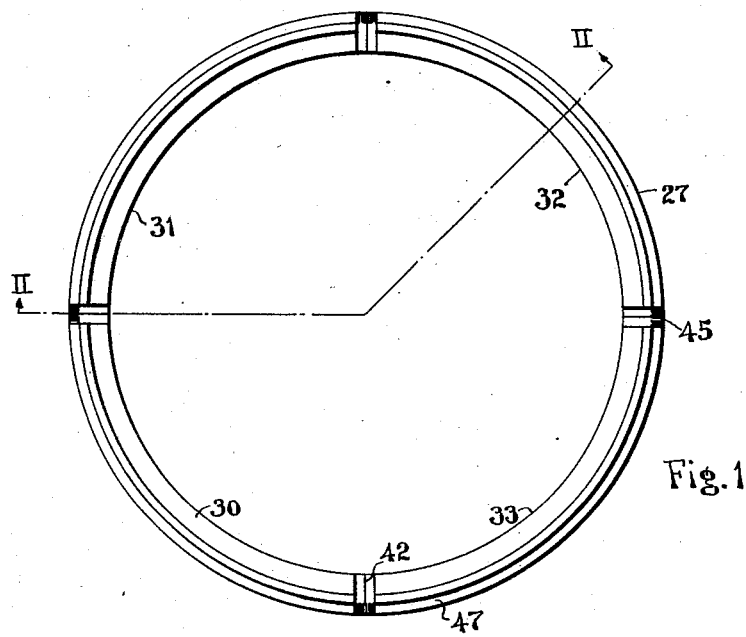
Figure 1 is a plan view of the sections of the ring utilized to support the base of the tire during the vulcanizing operation.
Figure 2:
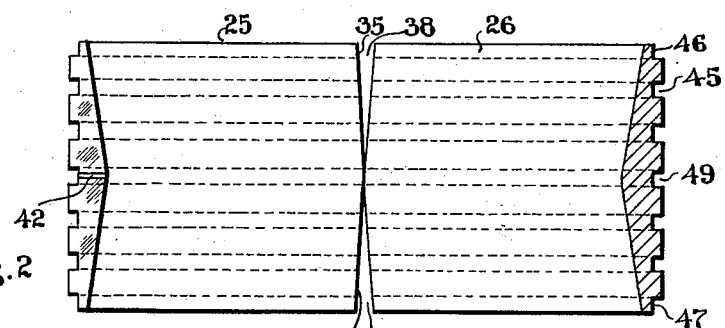
Figure 2 is a cross-sectional view, taken substantially along the line II—II of Figure 1.
Figure 3:
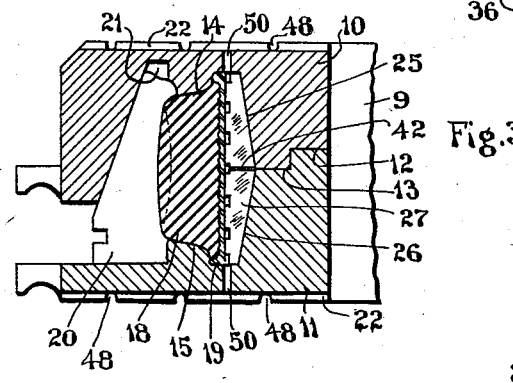
Figure 3 is a cross-sectional view of a solid tire vulcanizing mold embodying the invention, taken between adjacent sections of the tire base supporting ring.

Referring to Figure 3, a mold 9 is composed of upper and lower annular sections 10 and 11, which normally register along adjacent annular faces 12 and 13. Oppositely disposed inner peripheral surfaces 14 and 15 of the sections 11 and 12 are adapted to receive opposite side portions of a tire 18. This tire is mounted upon an annular base band 19, which has a substantially cylindrical inner periphery. Outwardly beyond the surfaces 14 and 15, the sections 10 and 11 are provided with an intermediately disposed cavity 21, adapted normally to receive a tread ring 20, which, during the vulcanizing operation, forms a tread surface on the tire. Inwardly of the surfaces 14 and 15, the sections are provided, respectively, with cavities 25 and 26, in which a ring 27 is disposed in order to support the inner cylindrical surface of the base band 19.

The ring 27 is composed of four sections 30, 31, 32 and 33, having equal circumferential lengths, the ends of which are inclined inwardly, as indicated at 35 and 36, from points midway between the opposite edges thereof, thus providing triangular recesses 38 and 39 between the ends of adjacent sections. Preferably, the ends of adjacent sections, instead of contacting along radially extending lines, contact along plane surfaces, as indicated at 42, in order to provide wider abutting seats between the ends of the sections.

Each of the sections on its outer periphery is provided with longitudinally extending grooves 45, which register circumferentially with the grooves of the adjacent sections. A pair of the grooves 46 and 47 preferably are located at the extreme outer edges of the sections. A middle groove, indicated at 49, is relatively wider than the plane surfaces 42 on the ends of each of the sections, in order that the ends of this groove will be open to the triangular recesses 38 and 39.

The opposite side faces of the sections 10 and 11 are provided with annular grooves 48 and radial grooves 22, which latter grooves are open to the outside of the mold and to the open space centrally thereof. One or more transversely extending openings 50 provide communication between the radially disposed grooves 22 and the aforesaid grooves 46 and 47 at the edges of the sections of the ring 27.

When the elements of the mold are in assembled relation, as shown by Figure 3, the sectional ring 27 is disposed adjacent the annular tire supporting base 19, with the grooves 45 in the latter, adjacent the base band 19. Steam, or other heating medium present about the mold during the vulcanizing operation, flows through the grooves 48 and 22 in the upper and lower surfaces of the sections 10 and 11 of the mold, and through the openings 50 into the grooves 46 and 47 on the ring 27. Thence, the medium flows into the triangular spaces 38 and 39 between the ends of the sections of the ring and through the remaining grooves therein. Consequently, the medium is permitted to circulate freely immediately adjacent the annular tire supporting base band 19.

It is to be understood that the ring 27 may be composed of any number of sections as found desirable, or that it may be composed of a single member, either split at one point or endless. If the split ring is employed, the space between the ends thereof serves as an intercommunicating passage between the grooves 45. However, any suitable communicating means may be provided, such as other grooves intersecting the grooves 45. Moreover, it should be understood that instead of employing a complete ring, one or more of the sections alone may be employed, as for example when only a portion of a tire is to be cured.

From the foregoing description, it is apparent that a mold assembly has been provided which assures that a tire will uniformly be cured, especially the parts thereof adjacent its inner periphery, by the employment of a supporting ring which is grooved to permit the flow of steam or other vulcanizing medium immediately adjacent the inner periphery of the tire. It is also apparent that this construction obviates the formation of air pockets between the tire and the aforesaid supporting ring. Moreover, the construction is relatively inexpensive in view of the simplicity of the operations of forming the circumferentially extending grooves in the sections of the mold and of inclining the ends of the sections of the ring in the manner described.

Although I have illustrated only one form which the invention may assume and have described in detail only a single application thereof, it will be apparent to those skilled in the art that the invention is not so limited, but that various minor modifications may be made therein without departing from the spirit of the invention or from the scope of the appended claims.

What I claim is:

1. The combination with a mold for vulcanizing tires, of a sectional ring for supporting a tire during the vulcanizing operation, the sections of the ring having one or more recesses in their outer peripheral surfaces, said mold having one or more other recesses communicating with the exterior of the mold and the recesses in the sections of the ring.

2. The combination with a mold for vulcanizing tires, of a ring for supporting a tire during the vulcanizing operation, said ring having one or more circumferentially extending recesses in its outer peripheral surface and at least one transversely extending recess communicating with the circumferentially extending recesses in the ring, said mold having a recess communicating with the other recesses and the exterior of the mold.

3. The combination with a mold for vulcanizing tires, of a sectional ring for supporting a tire during the vulcanizing operation, the sections of the ring having one or more circumferentially extending recesses in their outer peripheral surfaces, said mold having one or more other recesses communicating with the exterior of the mold and the recesses in the sections of the ring.

4. The combination with a mold for vulcanizing tires, of a circumferentially extending member for supporting a tire during the vulcanizing operation, said member having one or more recesses in its outer peripheral surfaces, said mold having one or more other recesses communicating with the exterior of the mold and the recesses in the member.

5. The combination with a mold for vulcanizing tires, of a sectional ring for supporting a tire during the vulcanizing operation, the sections of the ring having recesses in their outer peripheral surfaces, said sections also having recesses between their ends, said mold having a recess communicating with the recesses between the sections of the ring, and the exterior of the mold.

6. The combination with a mold for vulcanizing tires, of a sectional ring for supporting a tire during the vulcanizing operation, the sections of the ring having circumferentially extending recesses in their outer peripheral surfaces, the adjacent ends of two or more sections having spaced portions in order to provide a recess with which the circumferentially extending recesses in the sections of the ring communicate, said mold having a recess communicating with the exterior of the mold and the recess between the ring sections.

In witness whereof, I have hereunto signed my name.

Signed at Akron, in the county of Summit and State of Ohio, U. S. A., this 4th day of August, 1928.

PARRY KELLER.